July 24, 1951

A. E. GLOW ET AL 2,561,853

BALE LOADING AND CLOSING APPARATUS

Filed Feb. 19, 1948

Arthur E. Glow,
Lige Coakley,
Inventors.
Haynes and Koenig
Attorneys.

July 24, 1951

A. E. GLOW ET AL 2,561,853

BALE LOADING AND CLOSING APPARATUS

Filed Feb. 19, 1948

Arthur E. Glow,
Lige Coakley,
Inventors
Haynes and Koenig
Attorneys

July 24, 1951  A. E. GLOW ET AL  2,561,853
BALE LOADING AND CLOSING APPARATUS
Filed Feb. 19, 1948  4 Sheets-Sheet 3
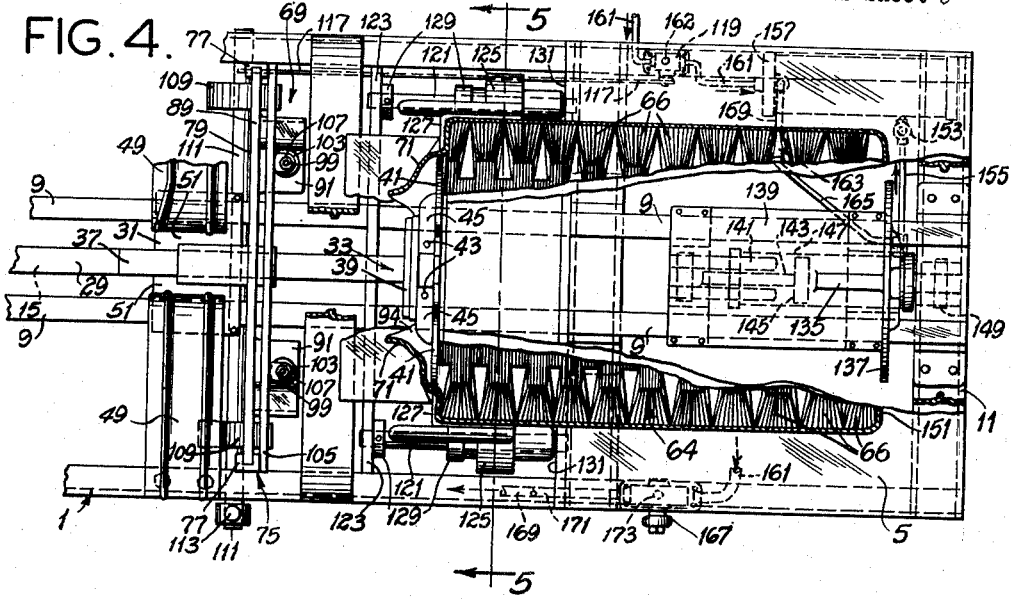
FIG. 4.
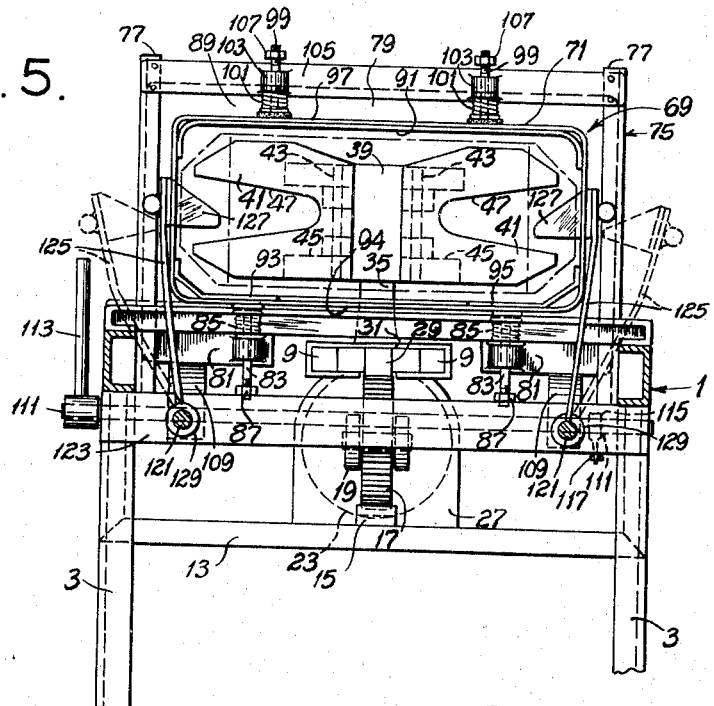
FIG. 5.
Arthur E. Glow,
Lige Coakley,
Inventors.
Haynes and Koenig
Attorneys.

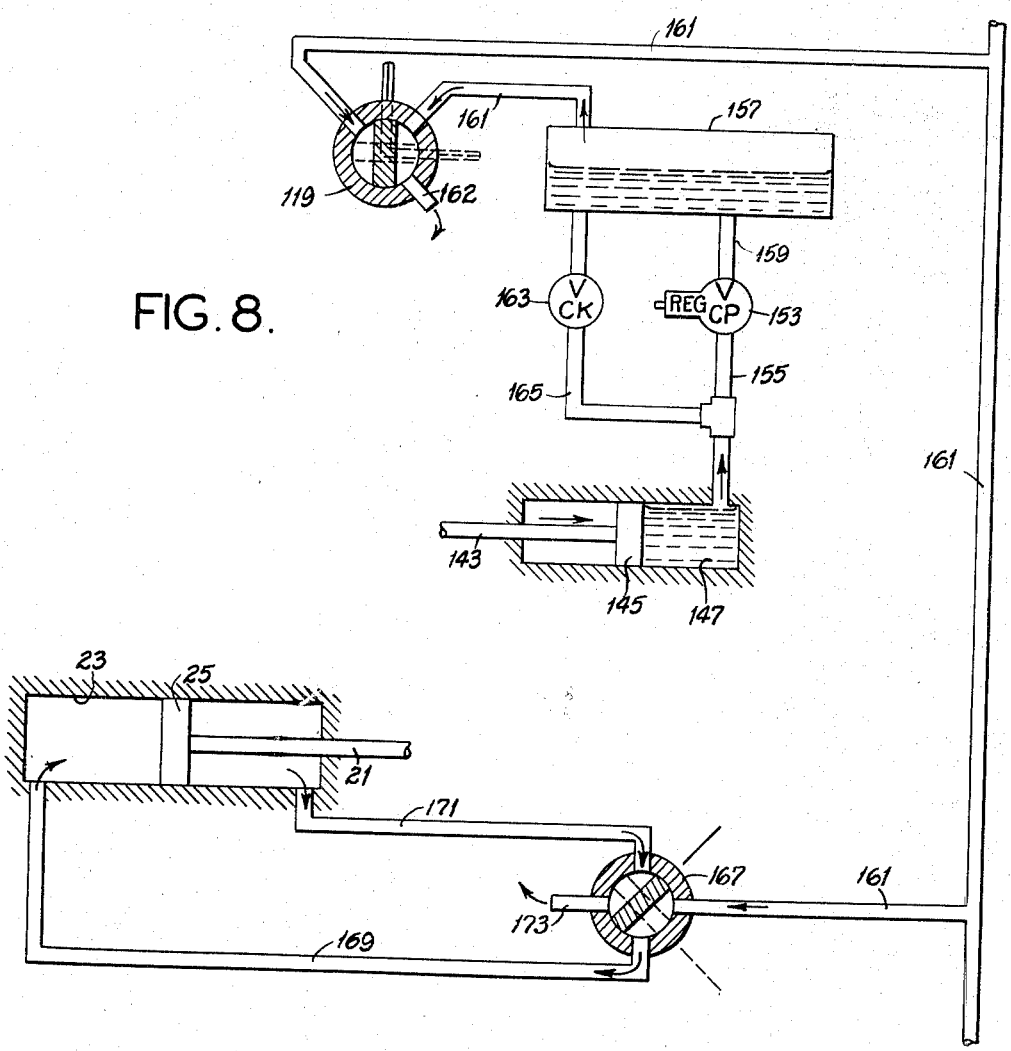

Patented July 24, 1951

2,561,853

UNITED STATES PATENT OFFICE 2,561,853

BALE LOADING AND CLOSING APPARATUS

Arthur E. Glow and Lige Coakley, East Pepperell, Mass., assignors to Bemis Bro. Bag Company, St. Louis, Mo., a corporation of Missouri Application February 19, 1948, Serial No. 9,445

15 Claims. (Cl. 226—14)

This invention relates to bale loading and closing apparatus, and with regard to certain more specific features, to apparatus for loading commercial bags into bales of bag-like form and closing the latter.

The invention is an improvement upon the apparatus shown in United States Patents 2,342,565, dated February 22, 1944; 2,374,147, dated April 17, 1945; and 2,402,476, dated June 18, 1946.

Among the several objects of the invention may be noted the provision of apparatus for quickly and conveniently semi-automatically loading and closing bales of the general nature shown in said Patent 2,342,565 and according to the method specified in said Patent 2,402,476, or similar methods; the provision of apparatus of the class described which minimizes misalignment and curling of the edges of bags when they are inserted into paper bales, thereby producing a bale of bags which may be used in conjunction with automatic filling machinery for the bags, without the mishaps in connection with the latter which often cause spilling and waste of material; the provision of apparatus of this class which predetermines tension in the bale as loading occurs and which conveniently and accurately predetermines final compression of the contents of the bale; and the provision of apparatus of this class which is compactly and rigidly constructed. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is an isometric view of the machine supplied with an empty bale to be loaded and provided with a tray full of bags about to be inserted into the empty bale;

Fig. 4 is a plan view on an enlarged scale of certain parts viewed from line 4—4 of Fig. 3, parts being broken away;

Fig. 5 is a vertical section taken on line 5—5 of Fig. 4, the bale shown in Fig. 4 being shown but certain bags ahead of the section line being removed for clarity;

Fig. 6 is an isometric view of a tray;

Fig. 7 is an isometric view of a finished bag-loaded and sealed bale; and,

Fig. 8 is a fluid-circuit diagram.

Similar reference characters indicate corresponding parts throughout the several views of the drawings.

Figure 1:
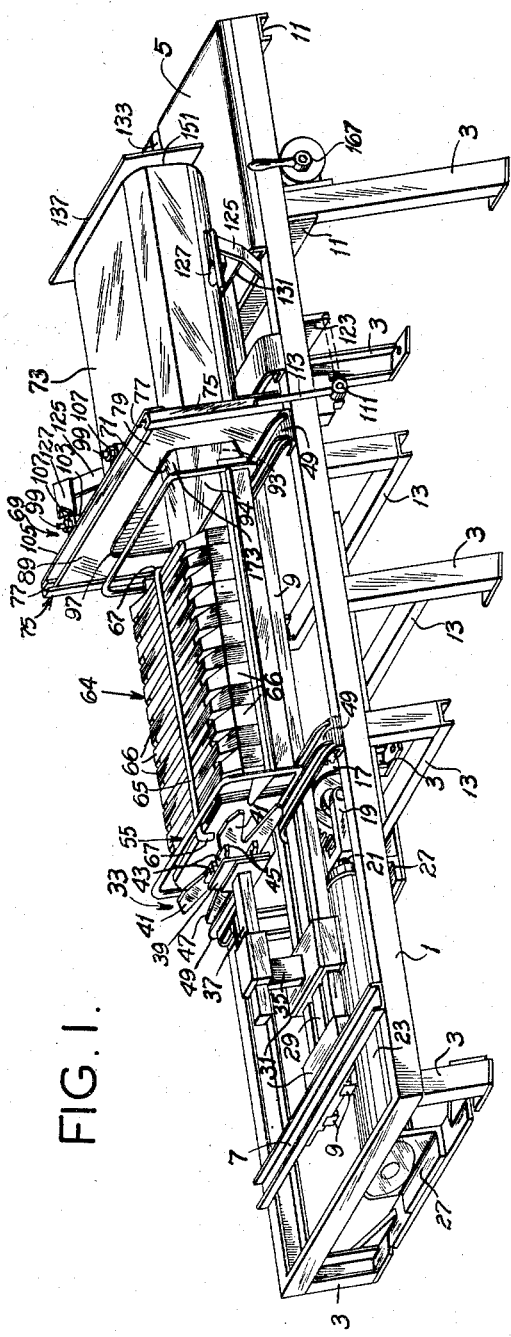

In said patents it is made clear what the advantages are in transporting commercial bags by packaging them in an accurate, compressed arrangement in a bag-like bale which itself is maintained in tension. The resulting bale is neat in appearance and, due to the compression of the contents, its own tension presents a hard package which may be abused in transit without damage to the edges of the contained bags. The present invention produces loaded bales at a rapid rate and improves the accuracy with which the bags are contained in the bales so that when the bags are released from the bales for feeding into automatic bag-packaging and filling machines, perfect coordination will be attained without the usual hazards of jamming the automatic machines or spilling the product entering the bags.

Referring now more particularly to the drawings, numeral 1 indicates a sloping bed supported upon legs 3 and having a rear platform 5. At the front is a cross support 7 for a pair of longitudinal guides 9. The guides are also supported at the rear upon cross members 11. Intermediately, the bed 1 is provided with cross yokes 13 which extend across and below the guides 9 with enough clearance to admit of certain ram parts referred to below.

The ram parts include a longitudinal stationary rack 15 carried on yokes 13 with which meshes a gear 17 carried in a clevis 19 on the end of a piston rod 21. The piston rod reaches into an air cylinder 23 and is therein attached to a double-acting reciprocating piston 25. The cylinder is supported upon suitable brackets 27 connected with the bed 1.

The gear 17 also meshes with a movable rack 29 which is attached to three sliding crossheads 31, the latter being borne upon the longitudinal guides 9. By admitting air ahead of the piston 25 and thrusting the gear 17 rearward, the gear is caused to roll along the stationary rack 15 and to advance the movable rack 29 at twice the speed of the piston, which considerably reduces the space needed for power requirements.

The central movable crosshead 31 carries a ram head assembly indicated generally at numeral 33. Specifically, this comprises a lateral support 35 on the central crosshead 31. It includes a rearwardly extending arm 37. At the rear end of arm 37 is a platen 39 which carries heads 41 pivoted respectively at 43. Thus heads 41 may hinge toward one another toward the rear of the machine but are normally biased toward stops 45 by reason of the general upward slant of the machine toward its back. If desired, the heads 41 may be spring biased to their positions against the stops 45 as shown in said Patent 2,374,147. The heads 41 are notched, as shown at 47, for purposes which will appear.

In view of the above, it will be seen that the ram head assembly 33 may be reciprocated back and forth by alternately admitting air on opposite sides of the piston 25 and properly exhausting it on the opposite sides.

At the rear end of the machine (Fig. 1) is a control valve 167 for admitting air from a supply pipe 161 to one end or the other of the cylinder 23 via pipes 169 and 171 (see also Fig. 8). This valve 167 also includes relief means 173 so that when one end of the air cylinder receives air over one of the pipes 169 or 171, the other end of the cylinder will exhaust over the other of said pipes 169 or 171.

Across the mid portion of the machine extend tray guides 49, which in effect constitute cantilevers reaching from the sides of the bed 1 toward the center line of the machine but allowing spaces 51 (see Fig. 4) between their inner ends for passage of the support 35 of the ram head 33. The purpose of these tray guides is to receive the bottom supports 53 of a bag tray shown generally at numeral 55 (Fig. 6). The inner ends of the supports 53 are also spaced, as shown at 57, for admitting passage of the ram assembly support 35 when the tray is positioned centrally on the tray guides 49 (see Fig. 1). End yokes 59 of the tray are formed in loops which accommodate passage of the ram heads 41. The front yoke 59 of the tray 55 includes tongues 61 which cooperate with the notches 47 of the heads 41 to permit passage of the heads through the tray. The yokes 59 of each tray are jointed by angle pieces 63 for supporting a column of bags 64 in the tray, as shown in Figs. 1 and 4, the tongues 61 preventing this column of bags from gravitating forward when the tray is on a slant. As indicated in Figs. 1 and 4, the bags to be baled may be arranged in oppositely directed bundles 66 of 25 or so each, and held together by means of a temporarily applied rod 65 having end hooks 67. Although the groups of bags are shown in Figs. 1 and 4 as being alternately laterally staggered in order to take care of ends that are thicker than the mouths, this would not always be necessary where the ends are not substantially thicker. Also, if desired, the bags need not be laterally offset by groups.

Figure 2:
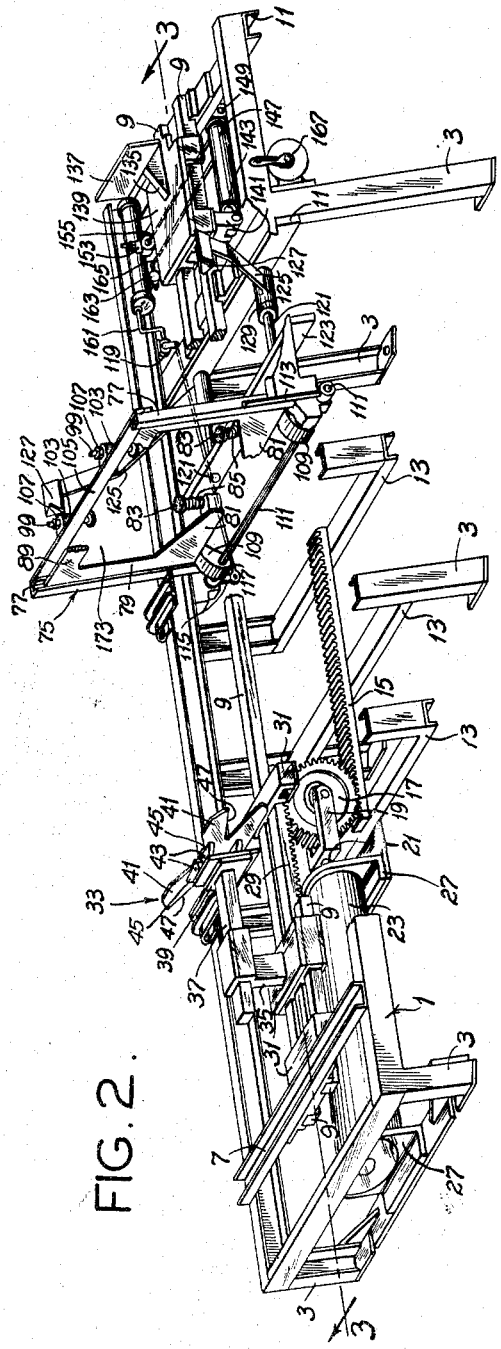
Fig. 2 is a skeleton view of parts of Fig. 1 with the bale and bags removed, parts being broken away.
Figure 3:
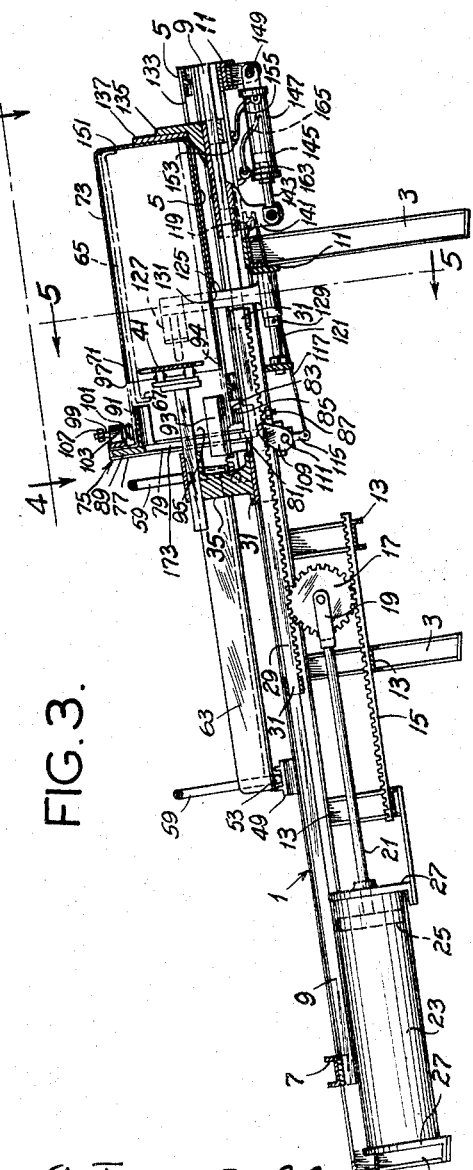
Fig. 3 is a cross section taken on line 3—3 of Fig. 2 but showing in position a bale and bags loaded therein.

On the bed behind the tray guides 49 is located a jaw mechanism shown generally at 69, for resiliently gripping the mouth 71 of a paper baling bag 73 into which the column of bags 64 is to be pushed from the tray 55. This jaw mechanism comprises a stationary frame 75 extending up from the bed 1 and having upright guides 77. Sliding in the guides 77 is an open yoke 79 which on its bottom portion includes inwardly directed arms 81 (Figs. 2, 3 and 5). These arms carry slidable mushroom grip pins 83. These pins are biased upward by springs 85, their upper positions being limited by end stops 87. The upper heads of these pins 83 resiliently cooperate with the bottom of a lower rearwardly extending stationary cuff 93, fastened to the back of the frame 75 by means of a web plate 95. This cuff 93 is for cooperation with the lower lip 94 of a bale mouth.

The upper crossbar 89 of the yoke 79 includes a rearwardly extending cuff 91 for engagement with the inside of the upper lip 97 of a bale mouth. Cooperating with this cuff 91 are mushroom pins 99 biased down by means of springs 101 and slidable in lugs 103 extending from the top 105 of the frame 75. The downward positions of these pins 99 are limited by end stops 107. From the above it will be clear that if the yoke 79 is lifting while a bag mouth is in position around the cuffs 91 and 93, then the mushroom pins 83 will be resiliently biased against the lower lip 94 of the mouth and the upper lip 97 of the mouth will be resiliently engaged by the mushroom pins 99. Further details of this will be described in connection with the operation of the device.

Lifting of the yoke 79 is accomplished by means of lift cams 109 carried on a camshaft 111 which may be operated from a control handle 113 on one side of the machine. On the other side of the machine the camshaft 111 carries a lever 115 having a connecting rod 117 reaching to an air valve 119, the purpose of which will be described below.

Behind the frame 75 are located a pair of longitudinal studs 121. These are supported between a stationary crossbar 123 and one of the crossbars 11. Rotatable on these studs are gripper arms 125 having finger grips 127. These arms may be swung inwardly toward one another, as shown in solid lines in Fig. 5, or swung outward, as shown by the dotted lines in that figure. They are also positioned longitudinally on the studs 121 by collars 129.

Motion of the gripper arms 125 is accommodated by openings 131 in the platform 5. This platform also has a central slot 133 at its rear for the reception of a moving support 135 of a moving backstop 137. The support 135 is carried upon a crosshead 139 which slides on the longitudinal guides 9 where these extend under the platform 5. The crosshead 139 is provided with a downwardly directed clevis 141 pinned to the outer end of a piston rod 143. Rod 143 is connected to a piston 145 in a hydraulic cylinder 147, the latter being pivoted at 149 to the rearward crossbar 11 of the bed 1. The purpose of the backstop 137 on the crosshead 139 is to provide a resilient seat for the bottom 151 of the bale 73 when the latter receives the column of bags 64. This occurs as the bags are pushed up against said bottom to strip the bale from the jaw mechanism 69.

In order to provide resilient resistance in the backstop, provision is made for compressing the hydraulic fluid in the cylinder 147. This fluid is moved by the piston 145 but its displacement is resisted by means of a pressure relief valve 153 which is connected to the rear end of the cylinder 147 by means of a pipe 155 (Figs. 4 and 8). The relief valve 153 may be set for any predetermined pressure at which it relieves through a connection 159 into an oil reservoir 157. This oil reservoir carries compressed air over the oil which, at the time that fluid comes into the reservoir, is exhausted through an exhaust port 162. In order to return fluid from the reservoir to the cylinder 147, the air valve 119 is set to close its relief port 162 and to admit air from an air supply pipe 161 into the oil reservoir. This forces oil through a check valve 163 in a line 165 leading from the reservoir 157 to the rear end of the hydraulic cylinder 147. The check valve 163 is for the purpose of preventing passage of oil from the cylinder 147 to the oil reservoir via pipe 165. The air valve 119 is controlled by operation of the camshaft 111 through a connecting rod 117 according to a timing which will be described.

Operation of the machine is as follows:

The valve 167 is set to admit air via line 171 behind the piston 25 and to exhaust air via line 169 from the other side of the piston. This retracts the clevis 19, and the gear 17 rolling on rack 15 retracts the ram assembly 33 forward at twice the speed and double the distance of the gear movement (see Fig. 2).

A tray 55 is assumed to have been loaded with bags and a clamp bar 65 applied. The loading is such that alternate ends of the groups of bags are aligned respectively by means of the angle guides 63. The clamp bar 65 holds the column of bags as a unit. The column rests against the tongues 61. For this purpose the tray is loaded on a slant with the tongues 61 lowermost. This loading is done away from the present machine and a number of trays may be preloaded so as to be available at the machine.

Next, a tray 55 is slid into position with the supports 53 in the guides 49, the tray being centered.

The next operation, which if desired may be performed before the operations just described, is to throw the control handle 113 into the horizontal dotted-line position shown in Fig. 1, wherein the lift cams 109 are depressed and the air valve 119 is set for admitting air to the oil reservoir 157. This forces oil back to the hydraulic cylinder 147 via check valve 163 and line 165 and has the effect of driving forward the back stop 137. The grippers 125 are at this time swung out into the Fig. 2 position (see also the dotted lines of Fig. 5).

The operator next takes an empty bale and opens its mouth. He lays it between the backstop 137 and the frame 75, first applying its lower lip 94 beneath the cuff 93. He then lifts the clamp handle 113 partway up, which partially lifts the yoke 79 until the lower mushroom pins 83 resiliently push the lip against the bottom of the lower cuff. The clamp handle and the mechanism which it operates are adapted to maintain any position by reason of friction per se or suitable friction washers in the control linkage, if needed.

Next the operator places the upper lip 97 of the bale mouth over the upper cuff 91 and then raises the handle 113 to its vertical position shown in solid lines in the drawings. This causes the upper cuff 91, which is movable with the yoke 79, to move toward the resiliently biased upper mushroom pins 99. This resiliently grips the upper lip 97 and holds the mouth open. When the control handle 113 is in the vertical position, the valve 119 has been set so as to cut off the supply of air to the reservoir 159 and to open relief port 162 (Fig. 8).

Next, the valve 167 is set to introduce air via line 169 into the front end of the cylinder 23, and relieve air from the other end of this cylinder via line 171. This results in the ram assembly 33 being driven forward, the heads 41 entering the tray 55 and sweeping the column of bags as a unit from the tray through the opening 173 of the yoke 79. The mass of bags has a piston effect in the bale which puffs it out so that it accepts them freely, the air escaping forward around the bags through the bale mouth. In Fig. 1 the bale 73 is diagrammatically shown as it will puff out as the bags subsequently enter. Ultimately the column of bags 64 engages the bottom 151 of the bale and tensions the bale in view of the resilient grip of its mouth at the cuffs. This prevents any tendency for the bale to crinkle or act like an accordion against the backstop 137.

Next the bale, under further tension, is stripped from the cuffs 91 and 93 and the bottom is pressed against the backstop. The movement of the front piston 25 is thus applied to the backstop and the latter tends to move rearward, thus forcing the connected piston 145 rearward in the hydraulic cylinder 147. This tends to force fluid via line 155 through the adjustable pressure relief valve 153 into the oil reservoir 157 via connection 159. Thus adjustment of the valve 153 determines the maximum reaction which the backstop will set up to the action of the piston 25. The result is that every column of bags is placed under the same compression as every other column, regardless of its precise length and regardless of the total load capacity of the piston 25. The piston 25 reaches its rearward position before the full stroke of the piston 145 is exhausted. The backstop carriage 139 engages no positive stop prior to exhaustion of the stroke of the piston 25. Hence, the predetermined constant axial pressure on the column of bags 64 in the bale 73 is determined only by the adjustment of the relief valve 153. When piston 25 has reached the end of its stroke the heads 41 are opposite the finger grips 127.

The operator then moves in the grippers which partially fold in the sides of the bale mouth, thus holding the stack of bags in compression with the mouth of the bale partially closed. However, the operator may still reach into the mouth of the bale, which is partially open in a central vertical plane, and remove the clamp rod 65 which is now loose due to bag compression. This he does after having turned the control valve 167 so as to retract the ram assembly 33. The heads 41 may at this time angle rearward to clear the lateral part of the bale mouth that has been folded in. The cooperation of the fingers 127 with the notches 47 in the heads 41 also facilitates this withdrawing action. Then the operator folds the bale mouth completely shut and applies adhesive tape or the like for making a permanent closure. It will be noted that while the operator is making the final closure, the reaction for maintaining compression in the column of bags is between the backstop (from which pressure has not been released) and the fingers 127 of the in-folded grippers 125 acting through the bale wall. After the bale is sealed, the gripper arms 125 are swung out, which releases the fingers 127 from the filled bale so that it may be removed.

The last step is to move the handle 113 back to its horizontal position, which sets the valve 119 to feed compressed air to the fluid reservoir, thus returning the fluid and therefore the piston 145. This returns the backstop 137 to its initial forward position. The machine is then ready for repetition of the operation on the next tray of bags and the next bale.

An advantage of the fluid-resistance type of backstop is that the compression in all bales is the same, regardless of their lengths or the length of the column of material in them. Another advantage of the movable backstop is that the point at which the lugs 127 perform their gripping operation may be coordinated with the rearmost position assumed by the heads 41 and then so left, since the movable backstop will take care of any variations in lengths of bag columns and bales. Tension of each bale due to the expansive tendency of the column of bags therein will be the same as that of all other bales. This uniformity, with the precision with which the bags may be located, provides a much more reliable and satisfactory condition of the bags when they arrive at the automatic filling machines. These advantages are in addition to the advantage that each bale constitutes an accurately formed solid package in transit. The compact arrangement of the bags under compression protects their edges from scuffing.

It will be seen that although the apparatus is specifically designed for loading bags into bag-like bales, any other compressive articles could be similarly loaded into such bales or similar containers.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. Baling apparatus comprising a bed, a holder on said bed adapted resiliently to hold a bale mouth, a support on said bed for a column of articles to be baled, a reciprocating ram supported on the bed and adapted to move said column into the bale to its bottom and to strip the bag mouth from the resilient holder, a backstop normally positioned for reaction upon the bottom of a filled bale when displaced by the ram, an expansible fluid-chamber device biasing the backstop through a substantial distance to provide said reaction with substantial movement, and an adjustable fluid throttle member associated with said expansible device for maintaining the reaction throughout said substantial movement of the backstop.

2. Baling apparatus comprising a bed, a holder on said bed adapted resiliently to hold a bale mouth, a support on said bed for a column of articles to be baled, a reciprocating ram supported on the bed and adapted to move said column into the bale to its bottom and to strip the bag mouth from the resilient holder, a backstop normally positioned for reaction upon the bottom of a filled bale when displaced by the ram, a fluid-chamber device biasing the backstop through a substantial distance to provide said reaction with substantial movement, an adjustable fluid throttle outlet member associated with said fluid-chamber device for maintaining the reaction throughout said substantial movement of the backstop, and a conduit for returning fluid to said fluid-chamber device and by-passing said throttle member to return the backstop to its initial position.

3. Baling apparatus comprising an upwardly sloping bed, a bale-mouth holder on said bed, a support on said bed below the holder for a column of articles to be baled, a reciprocating ram guided on the bed below said holder adapted to be forced upward to move said column through the holder into a bale held thereon, a backstop above the holder for reaction upon the bottom of a filled bale, a resilient displacement device associated with the backstop for providing said reaction with substantial movement of the backstop, and laterally movable grippers between the backstop and the holder for partially closing in a bale and holding its contents while receiving reaction from the backstop when said ram is retracted from the holder.

4. Baling apparatus comprising a bed, a holder on said bed adapted resiliently to hold a bale mouth, a support on said bed for a column of articles to be baled, a reciprocating ram guided on the bed and adapted to be forced upward to move said column through the holder into a bale thereon and to strip the loaded bale from the holder, a movable backstop normally positioned adjacent the bottom of the bale before it is stripped from the holder and engageable therewith thereafter, a resilient mechanism biasing said backstop toward said normal position but yieldable under pressure from the filled and stripped bale, said ram having a predetermined ultimate position when the bale is stripped from the holder, gripping members movable into position adjacent the ram in said ultimate position to hold the articles in the bale against compression from the backstop upon retraction of the ram, and a device for releasing the resilient mechanism to release compression of the backstop on the bale for removal of the latter.

5. Baling apparatus comprising a bed, a bale-mouth holder on the bed for holding the open mouth of a bag-like bale having a closed bottom, a movable ram in front of said holder movable from a retracted position toward a held bale, a support between the holder and the ram for a column of articles to be baled, said ram being movable to force said column from its support and into the bale, a backstop behind the holder movable rearward from an initial position in which it is engaged by the bottom of a loaded bale, a resilient mechanism biasing the backstop against the bottom of the bale in all positions of the backstop when contacted by the bale bottom, and gripping members between the holder and the backstop and engageable with the forward end of the column through the bale sides to maintain a reaction to the backstop so that the ram may be withdrawn without immediately releasing compression in the column.

6. Baling apparatus comprising a bed, a bale-mouth holder on the bed for resiliently holding the open mouth of a bag-like bale having a closed bottom, a movable ram in front of said holder movable from a retracted position toward a held bale, a support between the holder and the ram for a column of articles to be baled, said ram being movable to force said column from its support into the bale, said support and the tray including openings permitting movement of the ram therethrough, a backstop behind the holder movable rearward from an initial position in which it is engaged by the bottom of a loaded bale, a resilient mechanism biasing the backstop against the bottom of the bale in all positions of the backstop when contacted by the bale bottom, releasable gripping members between the holder and the backstop and engageable with the forward end of the column through the bale sides to maintain a reaction to the backstop so that the ram may be withdrawn without immediately releasing compression in the column, and a mechanism for returning said backstop to its initial position after release of the releasable gripping members.

7. Baling apparatus comprising a bed, a bale-mouth holder on the bed for gripping the open mouth of a bag-like bale having a closed bottom, a movable ram in front of said holder movable longitudinally from a retracted position toward a gripped bale, a lateral support for the ram, the ram having an overhang with respect to the support, and a removable tray for containing between the holder and the ram a column of articles to be baled, said ram being movable to force said column from its tray into the bale, said tray including longitudinal bottom openings permitting movement therethrough of the lateral ram support.

8. Baling apparatus comprising a bed, a bale-mouth holder on the bed for gripping the open mouth of a bag-like bale having a closed bottom, a movable ram in front of said holder movable longitudinally from a retracted position toward a gripped bale, a lateral support for the ram, the ram having a relatively short overhang with respect to the support, a tray for containing between the holder and the ram a column of articles to be baled, a tray support on the bed, said ram being movable to force said column from the tray into the bale, said tray and the tray support including longitudinal openings permitting movement of the ram and its lateral support completely therethrough.

9. Baling apparatus comprising a bed, a bale-mouth holder on the bed for gripping the open mouth of a bag-like bale having a closed bottom, a movable ram in front of said holder movable from a retracted position toward a gripped bale, a sliding support for the ram, the ram having a relatively short overhang with respect to its support, a tray between the holder and the ram for a column of articles to be baled, said ram being movable to force said column from its tray into the bale, a tray support, said tray support and the tray including openings permitting movement of the ram support therethrough, a driver for the ram support comprising a pair of parallel toothed racks one of which is stationary on the bed and the other of which is attached to the ram support, a gear engaging both racks, and a piston for driving said gear along the stationary rack to drive the other rack in a movement ratio of 2:1 between the ram and the piston movements.

10. Baling apparatus comprising a longitudinal bed, a bale-mouth holder on the bed for gripping the open mouth of a bag-like bale having a closed bottom, a movable ram in front of said holder movable from a retracted position toward a gripped bale, a support between the holder and the ram for a column of articles to be baled, said ram being movable to force said column from its support into the bale, a pair of longitudinal parallel racks one of which is stationary and the other of which is attached to the ram, a gear engaging both racks, and a cylinder containing a piston driver for moving said gear along the stationary rack to drive the other rack in a movement ratio of 2:1 between the ram and piston movements.

11. Baling apparatus comprising a longitudinal bed, a bale-mouth holder on the bed for gripping the open mouth of a bag-like bale having a closed bottom, a movable ram in front of said holder movable from a retracted position toward a gripped bale, a support between the holder and the ram for a column of articles to be baled, said ram being movable to force said column from its support into the bale, a pair of longitudinal parallel racks one of which is stationary and the other of which is attached to the ram, a gear engaging both racks, and a cylinder containing a piston driver for moving said gear along the stationary rack to drive the other rack in a movement ratio of 2:1 between the ram and piston movements, the stationary rack being located under said article support and the movable rack being retractable over the cylinder.

12. Baling apparatus comprising a longitudinal bed, a bale-mouth holder on the bed for gripping the open mouth of a bag-like bale having a closed bottom, a movable ram in front of said holder movable from a retracted position toward a gripped bale, a sliding base for the ram, the ram having a relatively short overhang with respect to its base, a tray for containing between the holder and the ram a column of articles to be baled, said ram being movable longitudinally to force said column from its tray into the bale, a tray support, said tray support and the tray including openings permitting movement of the ram base therethrough, means for driving the ram base comprising a pair of longitudinally parallel toothed racks one of which is stationary on the bed and under the tray support and the other of which is movable and attached to the ram base, a gear engaging both racks, and a cylinder containing a piston driver for moving said gear along the stationary rack to drive the other in a movement ratio of 2:1 between the ram and piston movements, said movable rack being retractable over the cylinder.

13. Baling apparatus comprising a bed, a bale-mouth holder on the bed adapted resiliently to hold the open mouth of a bag-like bale having a closed bottom, a movable ram in front of said holder movable from a retracted position toward a held bale, a double-acting power piston for reciprocating said ram, a support between the holder and the ram for a column of articles to be baled, said ram being movable to force said column from its support into the bale and to strip the bale mouth from the resilient hold of the holder, said ram being retractable, a movable backstop behind the holder movable rearward from an initial position in which it is engaged by the bottom of a loaded bale to another position, a resilient compression device biasing the backstop against the bottom of the bale in all positions of the backstop when contacted by the bale bottom, and releasable grip members adapted to substitute a compressive hold on the column when the ram is retracted to receive reaction from said backstop due to the bias of the backstop.

14. Baling apparatus comprising a bed, a bale-mouth holder on the bed adapted resiliently to hold the open mouth of a bag-like bale having a closed bottom, a movable ram in front of said holder movable from a retracted position toward a held bale, a double-acting power piston for reciprocating said ram, a support between the holder and the ram for a column of articles to be baled, said ram advancing to force said column from its support into the bale and to strip the bale mouth from its holder, a movable backstop behind the holder movable rearward from an initial position in which it is engaged by the bottom of a loaded bale to another position, a resilient device biasing the backstop against the bottom of the bale in all positions of the backstop when contacted by the bale bottom and comprising a fluid cylinder having a compression piston connected to move with the backstop, a liquid reservoir having a connection adapted to receive liquid displaced by said compression piston, a resistance relief valve in said connection permitting flow only to the reservoir, a second connection having a check valve allowing flow only from the reservoir toward the compression piston, an expansive-fluid supply compartment for said reservoir and for said power piston, a first valve controlling flow of expansive fluid to the reservoir and a second valve controlling flow of expansive fluid to the power piston, a control for the resilient bale holder coordinated with said reservoir valve so that when the ram advances expansive fluid is released to allow of resistance-controlled flow of fluid to the reservoir, said control when in its other position being adapted to operate said valve to apply fluid pressure to the reservoir, whereby liquid is returned to the fluid cylinder to return the backstop to its initial position.

15. Baling apparatus comprising a bed, a resilient bale-mouth holder on the bed, a support ahead of the holder for articles to be baled, a reciprocating ram ahead of said articles adapted to sweep them toward said holder and into a bale held thereby, a reciprocating piston movable parallel to the ram, a gear adapted to be translated by the piston, a stationary rack engaged by the gear, a movable rack connected with the ram and also engaged by the gear whereby the ram is moved from the piston in a 2:1 ratio, a movable backstop behind the holder having a normal position adjacent a bale bottom when the bale mouth is resiliently held by the holder and adapted to be moved by action of the ram by way of said articles when the latter are pushed thereby against the bottom of the bale and also to strip the bale from the holder, a resilient device for holding said backstop against the bale bottom after the bale has been stripped, grippers for holding the articles in the bale adjacent the bag mouth when the reciprocating ram retracts, and a control device for releasing the resilient backstop holding device.

ARTHUR E. GLOW.
LIGE COAKLEY.

REFERENCES CITED

The following references are of record in the file of this patent:

UNITED STATES PATENTS

| Number | Name | Date |
| --- | --- | --- |
| 110,346 | Desgoffe | Dec. 20, 1870 |
| 380,185 | Chase | Mar. 27, 1888 |
| 942,257 | Hansen et al. | Dec. 7, 1909 |
| 1,345,926 | Harris | July 6, 1920 |
| 2,029,984 | Butterfield et al. | Feb. 4, 1936 |
| 2,113,115 | MacMillin et al. | Apr. 5, 1938 |
| 2,220,632 | Abbott | Nov. 5, 1940 |
| 2,347,147 | Weeks | Apr. 17, 1945 |
| 2,393,102 | Gribner | Jan. 18, 1946 |
| 2,402,476 | Weeks | June 18, 1946 |

FOREIGN PATENTS

| Number | Country | Date |
| --- | --- | --- |
| 547,609 | Great Britain | Sept. 3, 1942 |